Dec. 31, 1940. W. BLACK 2,226,801
HYDRAULIC GEAR OF THE FÖTTINGER TYPE
Filed April 5, 1938 2 Sheets-Sheet 1
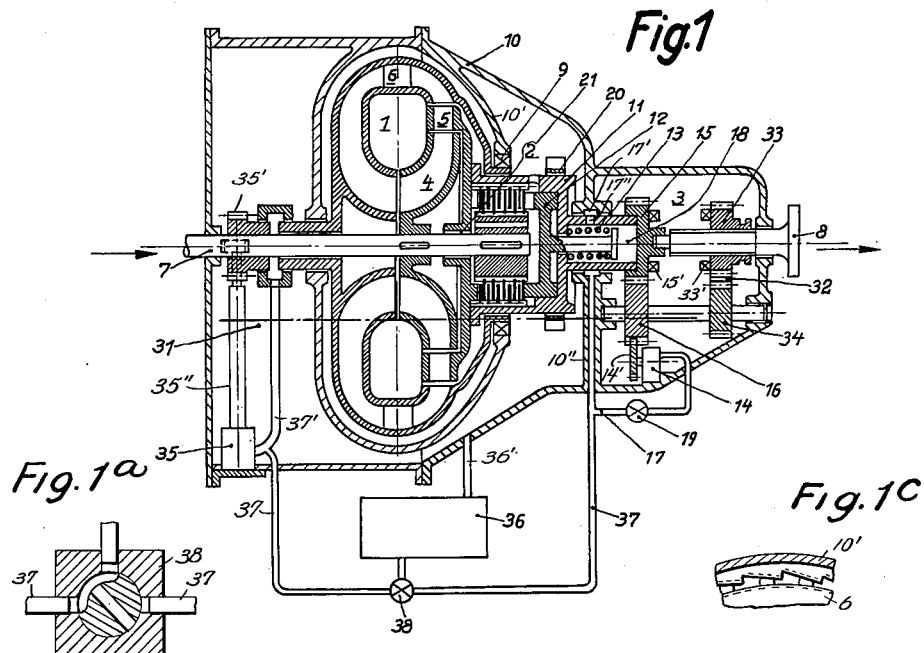
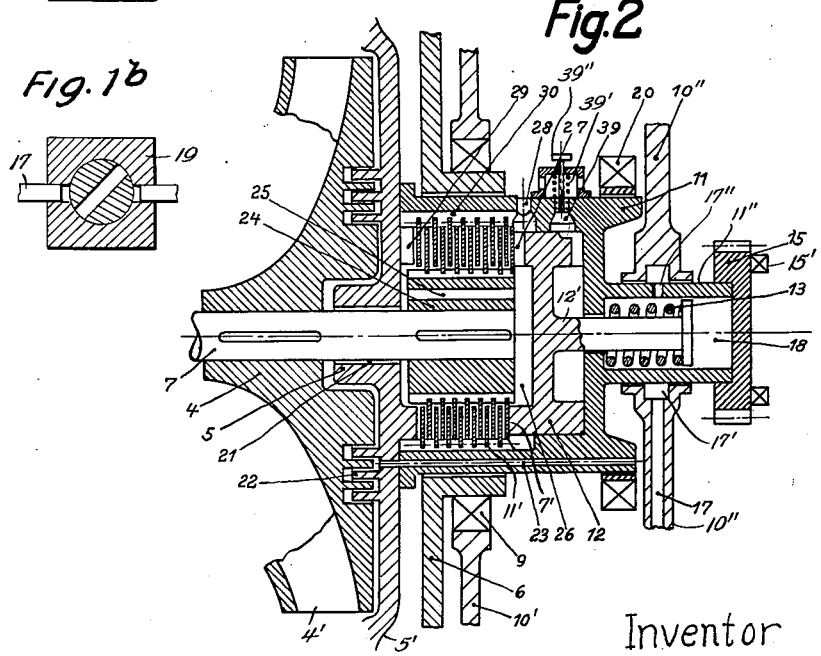
Inventor
WILLY BLACK
by Harry E. Dunham
ATTORNEY Dec. 31, 1940.   W. BLACK   2,226,801
HYDRAULIC GEAR OF THE FÖTTINGER TYPE
Filed April 5, 1938   2 Sheets-Sheet 2
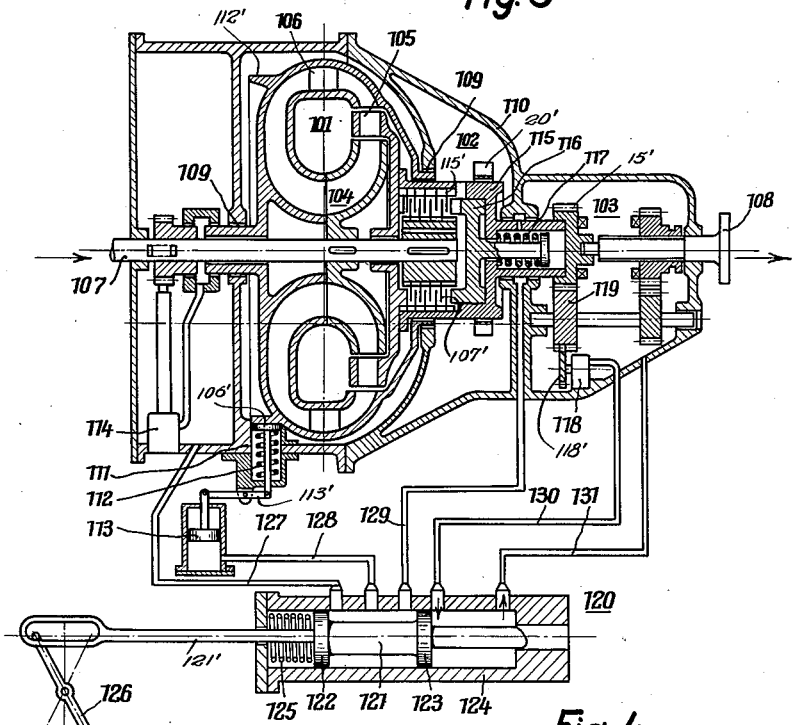
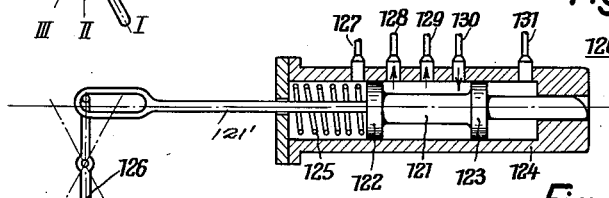
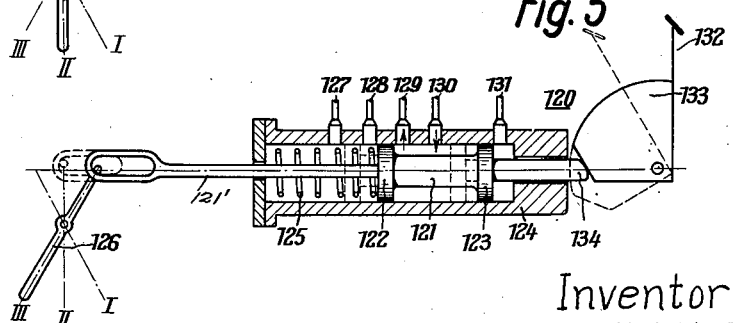
Inventor
WILLY BLACK
ATTORNEY Patented Dec. 31, 1940

2,226,801

UNITED STATES PATENT OFFICE 2,226,801

HYDRAULIC GEAR OF THE FÖTTINGER TYPE

Willy Black, Berlin-Halensee, Germany, assignor to General Electric Company, a corporation of New York Application April 5, 1938, Serial No. 200,225
In Germany April 6, 1937

9 Claims. (Cl. 192—.01)

This invention relates to hydraulic gear transmissions including hydraulic gear of the Föttinger type, and more particularly this invention relates to the adaptation of such hydraulic gear transmissions for the driving of automotive vehicles.

One object of my invention is to provide an improved arrangement of a hydraulic gear and a mechanical clutch whereby the efficiency of the transmission is greatly improved.

Another object of my invention is to provide an improved control for the elements of the hydraulic gear and of the mechanical clutch.

For a better understanding of my invention, together with other and further objects thereof, reference is had to the following description taken in connection with the accompanying drawings, and its scope will be pointed out in the appended claims.

In the accompanying drawings, Fig. 1 is a cross-sectional elevation through the axis of a hydraulic gear transmission built in accordance with my invention; Figs. 1a, 1b, and 1c are enlarged sectional views of the valves and overrunning clutch mechanism illustrated in Fig. 1; Fig. 2 is an enlarged view of the mechanical clutch illustrated in Fig. 1; Fig. 3 is a sectional view of a modification of my invention; and Figs. 4 and 5 are sectional views of the control valve illustrated in Fig. 3, the valve being shown in a different operating position in each of the three figures.

Referring to Fig. 1 in detail, the hydraulic gear transmission consists essentially of a hydraulic torque converter 1, a multiple disk clutch 2, and a mechanical gearing 3, operable for forward and reverse drive of a vehicle. The hydraulic torque converter is of the type known as the Föttinger type and is disclosed in detail in U. S. Patents 1,199,359 and 1,199,360. It comprises a pump wheel 4, a turbine wheel 5, and a guide wheel 6. The pump wheel 4 is secured to a driving shaft 7, and the turbine wheel 5 is connected to a driven shaft 8 through a shaft 11 and the gearing 3. The guide wheel 6 is mounted in a web 10' of the stationary casing 10 through an overrunning clutch 9 illustrated in detail in Fig. 1c. The arrangement of this clutch is such that, looking at Fig. 1, rotation of the guide wheel is permitted in a forward direction and prevented in a rearward direction.

The clutch 2 which is developed as a multiple disk clutch is located at the side of the torque converter 1, one set of its disks 7' being secured to the driving shaft 7, while the other set 11' is supported by the hollow shaft 11. In this hollow shaft 11, a power piston 12 is mounted, which piston produces an engagement of the two sets of clutch disks when moved forward by fluid pressure. The hollow shaft 11 is provided with an extension 11'' which is of smaller diameter and contains a shaft 12' attached to the piston 12 and a spring 13. This spring cooperates with the shaft 12' to hold the piston 12 in position to maintain the clutch in open position. In Figs. 1 and 2, the clutch is illustrated as being in the open position.

The piston 12 is operated by fluid under pressure supplied by a pump 14 mounted in the housing 10 and driven by gear 14' through gears 15 and 16, gear 15 being mounted on the end of the shaft portion 11'' and the gear 16 being one of the gears in the gearing 3. Since this shaft 11 is directly connected to the turbine wheel 5, it is independent of the vehicle speed and oil pressure is available independently thereof. The oil pump delivers oil through a pipe connection 17 controlled by a valve 19. The pipe 17 continues through a web 10'' in the casing 10, into an annular chamber 17' surrounding the hollow shaft section 11'' and through spaced holes 17'' into a chamber 18 within the hollow shaft section 11''. The oil pressure built up within the chamber 18 is transmitted to one side of the piston 12 by oil which is permitted to escape from the chamber 18 through a clearance space about the shaft 12' in a wall in the shaft which divides the reduced diameter section 11'' from the larger diameter section of the same shaft. Clearance space is also provided between the web 10'' and the shaft 11'' so that the oil pressure will not build up above a predetermined value.

The above-described arrangement of the clutch is of particular value in that the clutch and the hydraulic gear takes up no more space than the speed change gearing in a mechanical transmission. In this arrangement, the overrunning clutch surrounds the multiple disk clutch and the hollow shaft housing. This multiple plate clutch is used as a brake drum for a band brake 20, this brake being necessary to stop rotation of the turbine wheel when changing operations are performed in the gearing 3.

There is considerable advantage in the operation of the disk clutch by the pressure piston as above described. The clutch disks are subject to considerable wear and for normal mechanical operation would have to be adjusted at frequent periods. In view of the provision of a hydraulic cylinder, however, the stroke of the piston is initially adjusted for a length which is required for the maximum wear of the disks, and therefore, no adjustment is required during the entire life of the clutch plates.

Fig. 2 illustrates an enlarged cross-sectional view of the mechanical clutch. In this figure, it is apparent that owing to the clutch spacing of the hydraulic gear and the mechanical clutch, it is possible for leakage fluid to travel through the space 21 between the shaft 7 and the web 5' of the turbine wheel 5, and thereby, cause considerable friction within the clutch during torque conversion periods. In order to prevent an accumulation of oil in this chamber, a labyrinth packing 22 is provided between the turbine wheel and the pump wheel, a leakage opening 23 being provided from the inner labyrinth groove to drain oil seeping through this packing. Any oil that may seep past this last groove is deviated from the clutch plates by the provision of ducts on both sides of the clutch plates. One of these paths is through holes 25 in the core 24 and through ducts 27 to a hole 28. The other path is through ducts 29 and 30 to hole 28 through which this oil is forced by centrifugal force. In order to obtain satisfactory ejection of the liquid through the said aperture, the diameter of the clutch 2 and of the hollow shaft enclosing the clutch is made small enough so that they will be completely above the oil level indicated by line 31 in Fig. 1. This oil is accumulated in the lower part of the casing 10 and is pumped into the hydraulic gear as needed. In view of this small diameter of the clutch, it is necessary to increase the number of clutch disks and to make these of hardened and polished steel disks.

The mechanical gearing 3 is used for reversing operations. In the position of the gears illustrated in Figs. 1 and 2, the shaft 8 is driven for reverse operation. If it is desired to run forward, the gear 33 is moved towards the left, so that its teeth 33' will engage the teeth 15' on gear 15. This provides a direct connection between the shafts 11 and 8.

As stated above, the auxiliary pump 14 is provided to furnish the oil for operating the disk clutch. Oil pressure may, however, also be obtained from a pump 35 which is normally driven from the shaft 7 through a gear 35' and a cooperating shaft 35''. This pump normally supplies oil to the hydraulic gearing through a conduit 37' and, through a portion of the pipe 37 and a valve 38, forces some of this oil through a cooler 36 from which it is returned to the casing 10 through a pipe 36'. By a manipulation of the valve 38, this oil traveling through the cooler may be deviated to flow through pipe 37 to operate the clutch. The arrangement of this valve 38 is shown in Fig. 1a. In the position illustrated, a connection is made between the pipe 37 and the cooler. The valve may be turned an arcuate distance of approximately 90° to establish a connection to the clutch piston and simultaneously to break the connection to the cooler. The valve 19 connected between the pump 14 and the clutch piston is an ordinary shut-off valve, as shown in Fig. 1b, and can be operated to open the oil flow from the pump 14 into the conduit 37 and chamber 18, or to shut off completely this supply. It is, of course, obvious that for the purpose of obtaining the necessary oil pressure, the two pumps may be provided, or only one of them. For the sake of economy, it is advisable to omit the auxiliary pump 14. In cases where reliable operation is paramount, the auxiliary pump 14 may be used as a standby.

In the clutch piston chamber, the valve 39 is provided to prevent operation of the clutch at low speeds of the vehicle. It is obvious that on low speeds of a vehicle, it is desirable to operate the vehicle through the torque converting hydraulic gear and that the mechanical clutch under these conditions should be maintained in open position. In order to prevent an inexperienced driver from closing his clutch under these circumstances, a centrifugally operated valve 39 is provided. This valve is normally held in open position by a spring 39' mounted on its stem 39'', and in such position, permits oil to escape from the piston chamber. When the shaft 11 is up to normal speeds, however, the pressure of this spring is overcome and the valve closes, so that pressure may be built up in back of the piston to operate the clutch.

In the modification illustrated in Fig. 3, the transmission comprises a hydraulic torque converter member 101, a clutch 102, and a mechanical gear 103. The torque converter 101 comprises a pump wheel 104, a turbine wheel 105, and a guide wheel 106. The pump wheel is affixed to the driving shaft 107, the turbine wheel is connected to a hollow shaft 115, and the gearing 103 to the shaft 108. The guide wheel is rotatably mounted in a bearing 109 in the stationary casing 110. It may be held stationary by a brake mechanism 111 comprising a brake shoe 106' acting upon a brake drum 112' attached to the guide wheel. The brake is normally set by a spring 112 and is moved to open position by a piston 113 connected to the brake shoe through a linkage system 113'. Oil pressure is supplied by a pump 118 driven through suitable gearing connections from the shaft 115.

The clutch 102 is built into the hydraulic converter as in the modification illustrated in Fig. 1, being provided with a group of disks 107' attached to the driving shaft 107 and with a second group of disks 115' attached to the hollow shaft 115. The piston 116 for operating the clutch is mounted in the shaft 115, and is held in the open position by a spring 117. The oil for operating this piston is supplied by an oil pump 118 driven from the hollow shaft 115 through a set of gears 15', 119, and 118'. The oil for performing the various operations is in the present modification under the control of a multiple piston valve 120. This valve comprises a housing 124 within which upon a shaft 121 are mounted pistons 122 and 123 spaced from each other. The pistons are urged towards one end of this housing by a spring 125, and are urged to the other end of the housing by an operating lever 126. This operating lever is connected to the pistons by a rod 121'.

The piston assembly is operable to three operating positions, the operating lever 126 being capable of retaining this assembly in either one of three positions against the pressure of the spring 125. The three respective positions of this piston assembly are shown in Figs. 3, 4, and 5. The casing 124 is connected by five conduits 127, 128, 129, 130 and 131, to the transmission casing, to the oil pump 118, to the clutch piston chamber, and to the brake control means 113. The outlets to these five conduits are spaced along the housing 124 so as to connect several combinations in the different positions of the piston assembly. In Fig. 3, the piston assembly and the operating lever 126 are in position I.

In this position the discharge pipe 130 of the pump 118 is connected to the pipe 131 which opens into the casing 110 so that the oil discharged by the pump 118 merely returns to the reservoir or tank from which it is being pumped. The disk clutch in this position, therefore, is disengaged. The pipes 127, 128, and 129 are also connected to each other, and since no pressure source is available the brake 111 is set by its spring 112, the guide wheel 106 being thus held stationary and the hydraulic gear operates as a torque converter.

When the lever 126 is moved to position II, as illustrated in Fig. 4, the connection between the pressure pipe 130 and the pipe 131 is broken and the connection between the pressure pipe 130 and pipes 128 and 129 is established. Pressure, therefore, is placed upon the piston 113 to release the guide brake 111, and pressure is placed through conduit 129 upon the piston 116 to close the clutch. In this position of the lever 126, which is designated as position II, the guide wheel 106 is released, and a direct drive connection is established by the clutch 102 between the hollow driven shaft 115 and the drive shaft 107.

In the position shown in Fig. 5, in which the lever 126 assumes position III, the pipe 128 is disconnected from the oil pressure pipe 130 and is connected through pipe 127 to the oil reservoir in casing 110. The pressure piston 113 is, therefore, relieved and the brake 111 is again set to hold the guide wheel 106 stationary. The connection between pipes 130 and 129 is maintained in this position, so that the direct drive connection between shafts 107 and 115 is maintained. In this position, there is, therefore, a resistance to the rotation of the elements within the hydraulic converter, and a substantial braking effect is obtained.

In Fig. 5, an interlock between the fuel control lever 132 and the hydraulic gear control valve 120 is illustrated. A cam 133 is attached to the fuel control lever 132 and cooperates with a shaft 134 attached to the piston assembly within the valve 120. The cam surface is so arranged that when the fuel lever 132 is in its upper position, that is, in a position in which substantially no fuel is being fed to the prime mover, the shaft 134 will permit the cylinder assembly to assume its third position in which a direct connection between the shafts is permitted and a braking action is obtained by holding stationary the guide wheel 106. When fuel is fed to the engine, however, by the moving of the fuel lever 132, the cam surface 133 functions to move the shaft 134 and the cylinder assembly to the position illustrated in Fig. 4 wherein the guide wheel is released and only the clutch is closed for direct drive between the driving and driven shafts.

I claim:

1. In a hydraulic gear of the Föttinger type, the combination of a stationary casing, a pump wheel, and a turbine wheel, a hollow shaft supporting said turbine wheel within said casing, a drive shaft supporting said pump wheel and projecting into said hollow shaft, cooperating clutch plates mounted respectively on the inner surface of said hollow shaft and upon said drive shaft, and a piston within said hollow shaft operable by oil under pressure on one side of said piston to establish an engagement of said clutch plates.

2. In a hydraulic gear of the Föttinger type, the combination of a stationary casing, a pump wheel, and a turbine wheel, a hollow shaft supporting said turbine wheel within said casing, a drive shaft supporting said pump wheel and projecting into said hollow shaft, cooperating clutch plates mounted respectively on the inner surface of said hollow shaft and upon said drive shaft, a piston within said hollow shaft and operable by oil under pressure on one side of said piston to establish an engagement of said clutch plates, and a pump in said stationary casing connected to said hollow shaft and operable by said drive shaft to supply oil simultaneously from said casing to the said turbine and pump wheels and to said hollow shaft for operating said clutch piston.

3. In a hydraulic gear of the Föttinger type comprising a stationary gear casing, a pump wheel, a turbine wheel, a hollow shaft attached to said turbine wheel, a drive shaft projecting through said casing into said hollow shaft and supporting said pump wheel, cooperating clutch plates attached to said hollow shaft and to said drive shaft respectively, a fluid operated piston operable by oil pressure to produce an engagement of said cooperating clutch plates and a centrifugally operated valve in said hollow shaft normally held in an open position to prevent the operation of said piston and operable to a closed position when said hollow shaft has attained a predetermined speed.

4. In a hydraulic gear of the Föttinger type comprising a stationary gear casing, a pump wheel, a turbine wheel, a hollow shaft attached to said turbine wheel, a drive shaft projecting through said casing into said hollow shaft and supporting said pump wheel, cooperating clutch plates attached to said drive shaft and the inner surface of said hollow shaft respectively, a fluid operated piston for operating said clutch plates, and a band brake cooperating with the outer surface of said hollow shaft for braking said driven shaft.

5. In a hydraulic gear of the Föttinger type comprising a stationary casing, a pump wheel, a turbine wheel, a guide wheel, braking means for holding said guide wheel stationary, clutching means including a hollow shaft for supporting said turbine wheel, a second shaft supporting said pump wheel and projecting into said hollow shaft, cooperating clutch plates mounted on the inner surface of said hollow shaft and upon said driving shaft, and a piston within said hollow shaft for operating said plates to connect said driving and driven shafts, and means for simultaneously controlling said guide wheel brake and said clutch piston.

6. In a power transmission, the combination of a hydraulic gear of the Föttinger type including a pump wheel, a turbine wheel, a hollow shaft supporting said turbine wheel, a drive shaft supporting said pump wheel and projecting into said hollow shaft, clutch plates in said hollow shaft attached respectively to said hollow shaft and to said drive shaft, a guide wheel, a casing supporting said guide wheel and enclosing said pump and turbine wheels, and an overrunning clutch on the outside of said hollow shaft allowing said guide wheel and casing to rotate in one direction only.

7. In a hydraulic gear of the Föttinger type, the combination of a stationary casing, a pump wheel, a turbine wheel, a guide wheel, a hydraulically operated brake in said casing for braking said guide wheel, a clutch comprising a hollow driven shaft supporting said turbine wheel, a driving shaft supporting said pump wheel and projecting into said hollow shaft, cooperating clutch plates in said hollow shaft attached respectively to said hollow shaft and to said driving shaft, a hydraulically operated piston for controlling the operation of said clutch plates, an oil pump in said stationary casing connected to supply oil under pressure to said guide wheel brake and to said clutch piston, and a control valve operable to one position to apply said guide wheel brake and to close said clutch simultaneously, and operable to other positions to apply said brake and close said clutch respectively.

8. In a hydraulic transmission of the Föttinger type including a stationary casing, a pump wheel, a turbine wheel, a guide wheel, braking means for holding said guide wheel stationary, a mechanical clutch including a hollow shaft supporting said turbine wheel, a drive shaft supporting said pump wheel and projecting into said hollow shaft, cooperating clutch plates in said hollow shaft, and a hydraulically operated piston for controlling the operation of said clutch plates, a pump in said casing connected to supply oil for operating said guide wheel brake and said clutch, a control valve operable to cause the operation of said brake and clutch simultaneously or alternately, a fuel supply lever, and interlocking means between said lever and control valve operable to shift said control valve from the position in which said brake and said clutch are applied and closed simultaneously, to a position where said guide wheel brake is released and the said clutch is held closed upon actuation of said fuel supply lever.

9. In a hydraulic transmission of the Föttinger type including a stationary casing, a pump wheel, a turbine wheel, a guide wheel, braking means for holding said guide wheel stationary, a mechanical clutch including a hollow shaft supporting said turbine wheel, a drive shaft supporting said pump wheel and projecting into said hollow shaft, cooperating clutch plates in said hollow shaft, and a hydraulically operated piston for controlling the operation of said clutch plates, a pump in said casing connected to supply oil for operating said guide wheel brake and said clutch, a control valve operable to cause the operation of said brake and clutch simultaneously or alternately, a fuel supply lever, and interlocking means between said lever and control valve operable to shift said control valve from the vehicle retarding position to a vehicle running position upon actuation of said fuel supply lever.

WILLY BLACK